OR 3,838,403

X 3046C

United Sta

Maloney et al.

[11] 3,838,403

[45] Sept. 24, 1974

[54] STACKED PHOTOPLASTIC DATA STORAGE SYSTEM

[75] Inventors: William T. Maloney, Sudbury; Donald H. McMahon, Carlisle, both of Mass.

[73] Assignee: Sperry Rand Corporation, New York, N.Y.

[22] Filed: Mar. 30, 1973

[21] Appl. No.: 346,503

[52] U.S. Cl. .......... 340/173 TP, 96/1 R, 346/74 TP
[51] Int. Cl. ........................ G11c 13/04, G11c 11/42
[58] Field of Search ........... 340/173 TP; 346/74 TP; 96/1 R

[56] References Cited

UNITED STATES PATENTS

| | | | |
|---|---|---|---|
| 3,206,599 | 9/1965 | Gold | 340/173 TP |
| 3,560,205 | 2/1971 | Urbach | 340/173 TP |

*Primary Examiner*—Stuart N. Hecker
*Attorney, Agent, or Firm*—Howard P. Terry; S. C. Yeaton

[57] ABSTRACT

An electro-optical data storage system and method of operation thereof comprising the means and steps, respectively, for selectively recording and reading data stored in any of a plurality of tandemly disposed photoplastic plates. Data is recorded on each plate by uniformly charging a selected plate, exposing the selected plate to a data beam which modulates the charge to produce a charge pattern representative of the data, briefly heating the plate to a softened condition to develop the charge pattern as a deformation image on the photoplastic surface, and converting the deformation image to a latent image by briefly reheating the plate to a greater degree than used for developing the deformation image. The data stored in any plate is read out by uniformly recharging and again reheating a selected plate to reconstitute the latent image as a deformation image which modulates a beam propagating through the plate so that the stored data is imparted to the beam for readout.

14 Claims, 2 Drawing Figures

STACKED PHOTOPLASTIC DATA STORAGE SYSTEM

BACKGROUND OF THE INVENTION

1. Field of the Invention

This invention relates generally to electro-optical data storage technology and more particularly to an apparatus and method for electro-optically recording and reading data utilizing electrostatic charging-deformation imaging techniques.

2. Description of the Prior Art

Data storage by means of deformation imaging using photoconductive-thermoplastic media (hereinafter referred to as photoplastic) is presently well understood by those skilled in the art and is exemplified by U.S. Pat. Nos. 3,196,008 and 3,560,206 issued, respectively, on July 20, 1965 to Mihajlov, et al. and Feb. 2, 1971 to A. E. Jvirblis. The structure and operation of photoplastic storage media and limitations relating to the use thereof are explained in detail in these prior art patents. Briefly, the storage medium typically includes photoconductive and thermoplastic layers successively overcoated on an electrically conductive coated insulating substrate, but as noted in the above-mentioned Jvirblis patent the functions of the photoconductive and thermoplastic layers may be combined in a single deformable photoconductor or photoplastic medium. The procedure for storing data in image form on a photoplastic medium is as follows. A uniform electrostatic charge is applied to a surface of the photoplastic medium and the charged surface is then exposed to a data-bearing optical recording beam. The exposure changes the uniform electrostatic charge to a spatially modulated charge pattern representative of the data in the recording beam. The charge pattern is produced as a consequence of the exposing beam acting to cause charge migration in the illuminated regions of the photoconductor so as to alter the electric fields in the thermoplastic. After exposure, the photoplastic is uniformly recharged and then the image pattern is developed by applying heat of sufficient intensity to soften the thermoplastic temporarily, as a result of which surface deformations or corrugations are formed on the photoplastic representative of the spatially modulated charge pattern. Upon removal of the heat the deformation pattern or image hardens on the surface of the photoplastic. The deformation image may be read out by directing a light beam onto the photoplastic medium to produce an image of the recorded data for presentation on a viewing screen.

It is explained in the aforementioned Mihajlov et al patent that the localized surface deformations corresponding to the charge pattern are believed to occur because of electrostatic forces associated with the charge pattern. It is theorized that the charge pattern creates a condition of inherent instability at the charged surface of the photoplastic medium which upon being softened for developing, deforms in response to the electrostatic forces in a manner to eliminate the condition of instability. The degree of softening is limited, however, so that the charge pattern is retained after the surface is deformed. As further explained in the Mihajlov et al patent, the deformation image pattern may be erased simply by applying heat of prescribed intensity greater than that used for developing the image. This excessive heat has the effect of diffusing and neutralizing charged forces on the surface of the photoplastic medium so that the charge pattern is destroyed and thereby enabling surface tension forces to restore the surface to a smooth condition devoid of deformations.

Recording and reading of the data stored in the photoplastic medium may also be performed by means of holographic techniques as will be described hereinafter in the detailed description of the preferred embodiments. The operation of a holographic system distinguishes from the conventional imaging systems described in the aforementioned patents only in that recording is performed, after uniformly charging the photoplastic medium, by exposing the photoplastic to a pair of mutually coherent angularly spaced light beams directed thereon in at least partially superposed relation in the manner of conventional holographic practice whereby a spatially modulated charge pattern is produced in the usual fashion in accordance with the interference occurring between the two beams, one of the beams commonly being referred to as the signal or data-bearing beam and the other beam commonly being referred to as the reference beam. Developing and erasing are performed as explained for the conventional imaging systems. The stored data can be read out from the hologram prior to erasing simply by illuminating the photoplastic medium with a readout light beam directed, for example, along the path of the reference beam used for recording.

As is well known to those skilled in the art, the storage capacity of a thin planar recording medium is limited by the wavelength of the light used for recording and the useable area of the recording medium. In the interest of achieving a substantial increase in recording density without increasing the planar area, a system incorporating a stack of tandemly disposed holograms was devised heretofore and disclosed in U.S. Pat. No. 3,635,538 issued Jan. 18, 1972 to Caulfield et al. The Caulfield et al. system comprises a plurality of electrically controllable polar crystalline members serially disposed in the path of the recording and readout beams. Each polar crystalline member functions holographically for recording and readout only upon application of an electric potential thereto concurrently with the recording or readout beams. Since the recording beams and the readout beam affect only the individual polar crystalline member which is electrically energized at any instant, it is possible to arrange the respective crystalline members in closely spaced tandem relation thereby substantially increasing the storage capacity of the system while simultaneously reducing the angular range and resolution required of a light deflector for addressing the storage system as compared to a system in which the data is stored in a planar matrix.

SUMMARY OF THE INVENTION

The present invention relates to mass optical data storage techniques in the manner of the above-mentioned Caulfield et al system but is based on the use of photoplastic data storage media of the type disclosed by Jvirblis and Mihajlov et al in place of the polar crystalline media employed by Caulfield et al. More specifically, the operation of the present invention is based on the use of a unique characteristic found to exist in certain photoplastic media wherein the deformation image is converted to a latent image in readiness for being reconstituted as a deformation image by the steps of charging and developing but without any additional exposure except to a readout beam directed thereon. The conversion to a latent image is performed by heating the photoplastic in a controlled manner so as to remove the surface deformation. Thus, in the latent state, no apparent modulation of an incident readout light beam is observed, but upon being reconstituted as a deformation image the incident beam is affected so the recorded data is read out. The invention makes use of this latent image characteristic to provide a method for selectively recording and reading from any one of a plurality of tandemly disposed photoplastic plates, the data being stored in latent image form in each of the plates.

Selective recording is performed by charging one plate of the stack at a time, exposing the charged plate by directing a light beam (or beams in the case of holographic recording) through the stack of photoplastic plates to produce on the charged plate a spatially modulated charge pattern representative of the data to be stored, developing the exposed plate by applying heat thereto to soften the plastic so that the charge pattern is converted to a corresponding deformation image in the form of a wrinkled or corrugated image pattern on the surface of the photoplastic plate, removing the heat to enable the deformation image to harden, and finally briefly applying greater heat than used in developing for effectively smoothing the surface of the photoplastic plate to convert the deformation image to a physically imperceptible latent image.

Readout of the data stored in any of the photoplastic plates is performed by selectively charging an individual plate, applying heat to the charged plate to soften the photoplastic once again to reconstitute the latent image as a deformation image, and directing a light beam onto the reconstituted deformation image to produce a diffracted beam which contains the stored data and which may be projected onto a viewing screen to display the data.

The respective steps of the method for both recording and reading may be performed successively or if desired some of the steps may be performed concurrently with others. For example, the data may be recorded by charging, exposing and developing simultaneously, that is the exposing light may be directed onto the photoplastic plate concurrently with application of the charge and then both the charging means and the exposing means may remain activated while the spatially modulated charge pattern is developed by heating. Alternatively, either the charging means or the exposing means or both may be deactivated during development. It should be noted that in the case where the charging means remains activated during and after exposing and perhaps also while developing, that the effect is the same as recharging prior to developing as explained with reference to the previously mentioned Jvirblis and Mihajlov et al techniques. Moreover, as explained in the aforementioned Mihajlov et al patent, if the chosen photoplastic material is one which remains soft for a while after application of heat, softening may be performed before exposing or even before charging.

Further in accordance with the invention, apparatus is provided for recording and reading in the manner explained in the preceding paragraphs. A presently preferred holographic system embodying the principles of the invention comprises a plurality of tandemly disposed data storage units arranged in a stack and each including an insulator support substrate conductively coated on both sides and having successive photoconductive and thermoplastic layers overlaying the conductive coating so that each storage unit contains two photoplastic storage plates supported on a common substrate in back-to-back relation. A charging plate is positioned adjacent each end of the stack and intermediate the individual storage units and means is provided for directing the recording and readout light beams through the stack. In operation of the system, a uniform charge is applied to the surface of a selected photoplastic plate or portion thereof, as will be explained more fully in the subsequent detailed description, by connecting an electric potential source between a conductive coating on the substrate and the associated charging plate adjacent the surface of the photoplastic layer. The recording light beams then modulate the charge pattern as previously explained. Development of the deformation image is performed by briefly connecting an electric potential source across the conductive coating to supply current flow therethrough of sufficient amplitude and duration to generate the heat required for softening the thermoplastic layer. Upon disconnecting the potential source, the deformation image hardens in the surface of the thermoplastic layer. Briefly, reconnecting the potential source and adjusting the applied potential to produce heat somewhat greater than that used for developing causes partial erasure to the extent of removing any apparent surface deformations whereby the thermoplastic surface hardens in a smoothed condition upon removal of the heat and the deformation image is converted to a latent form. Data is selectively read out from any one of the photoplastic plates by charging and developing a selected plate in the same manner as for the case of recording whereupon the latent image is reconstituted as a deformation image so as to impart the stored data to a readout beam incident on the plate. A more detailed explanation of the structure and mode of operation of the invention is provided in the following description of the preferred embodiments which is given with reference to the accompanying drawings.

DESCRIPTION OF THE PREFERRED EMBODIMENT

Figure 1:
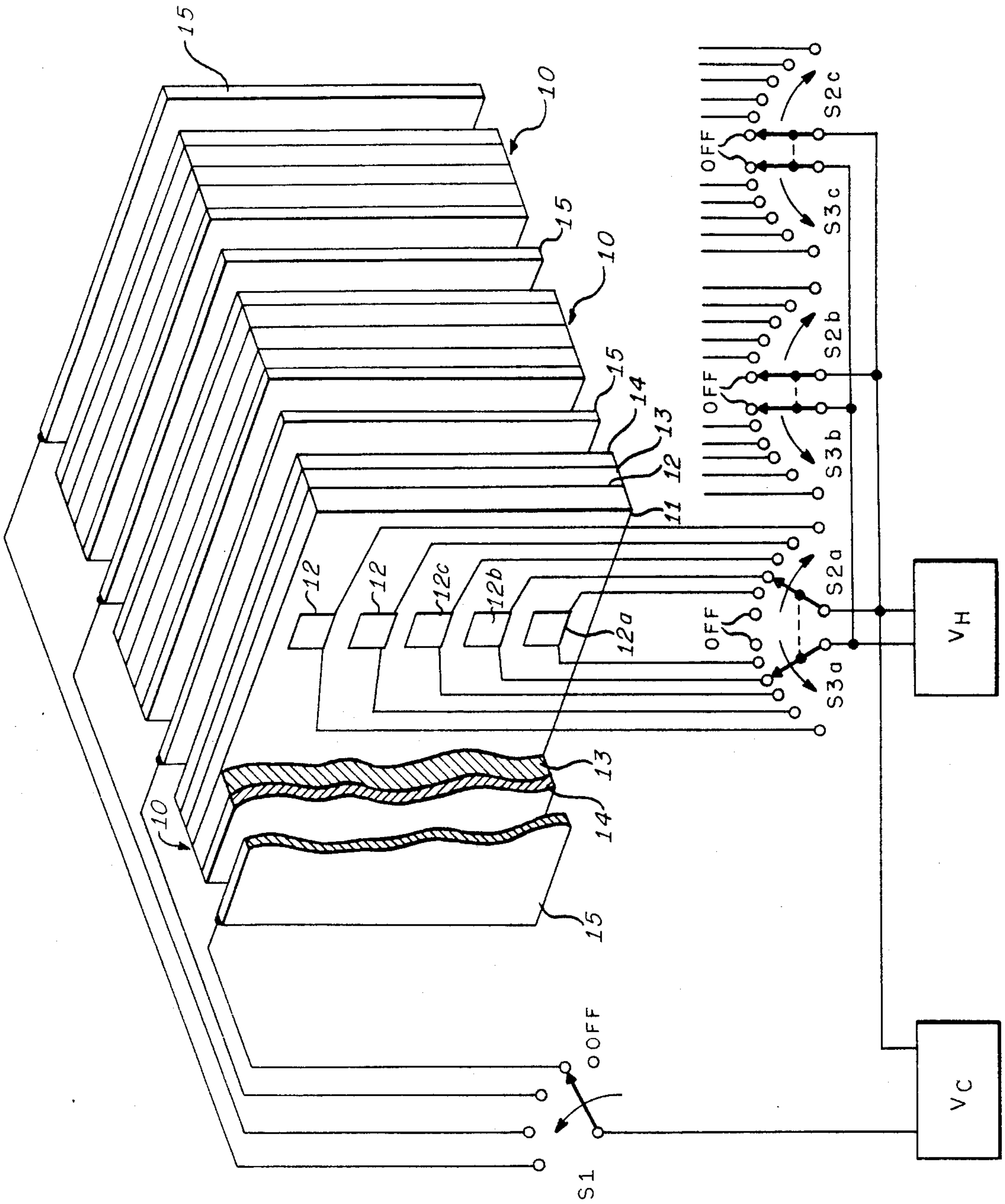
FIG. 1 is a perspective illustration of a system embodying the principles of the present invention and particularly depicting a preferred stack arrangement of storage units constructed in accordance with the teaching of the invention.

Referring to FIG. 1, apparatus embodying the principles of the invention includes a stack of tandemly disposed storage units 10 each including a dielectric substrate 11 having a thin conductive coating 12 on both sides overlaid respectively with a photoconductive layer 13 and a thermoplastic layer 14. Each storage unit thus contains two photoplastic plates, each comprising a substrate, a conductive coating, a photoconductive layer, and a thermoplastic layer and disposed in back-to-back relation on the common substrate. The substrate, conductive coating, and photoconductive and thermoplastic layers are all transmissive to light of the wavelength band used for recording and reading. The substrate may be made of glass having a thickness of about 1 millimeter so as to be sufficiently rigid for supporting the other layers of the storage unit. The conductive coating may be made of indium oxide or tin oxide, for example, with a thickness typically on the order of a few hundred angstroms to provide the desired light transmissivity and electrical resistivity. Poly (N-vinyl carbazole) complexed with 0.1 to 1.0 mole fraction of 2, 4, 7-Trinitro-9-Fluorenone coated from tetra hydrofuran solution has been found suitable for use as the photoconductive layer. Likewise Nevillac Soft resin produced by Neville Chemical Company, Pittsburgh, Pennsylvania and coated from trichloroethylene solution has functioned satisfactorily as the thermoplastic layer. Preferably, the thermoplastic and photoconductive layers should have thicknesses of about one-half to one micrometer and two and a half to five micrometers respectively. The above indicated dimensions and other quantitative data provided hereinafter should not be considered as limiting in any way but are merely to be construed as exemplary of a presently preferred configuration. A conductive charging plate 15 is typically positioned at such end of the stack and in between the respective storage units so that an individual charging plate is adjacent each thermoplastic layer and typically spaced therefrom about one thousandth of an inch. The height and width dimensions of the storage units may measure several centimeters or more. It will be appreciated, therefore, in view of the thin layered construction of the storage units and small spacing therebetween that the total depth of a stack containing even as many as a hundred storage units will be very small compared to the lateral extent of the stack, as distinguished from the longitudinally exploded presentation which is given in the figure for ease of illustration and description. It is possible to operate the apparatus in an air ambient but is considered preferable to operate in an ambient of inert gas, for example nitrogen to exclude oxygen which has been found to have a detrimental effect on operating life.

For the purpose of making multiple recordings on each photoplastic plate, the conductive coating on the substrate 11 is not constructed as a single continuous sheet but instead is formed of a multiplicity of discrete conductive segments 12*a*, *b*, *c*, etc., in registration with the subareas of the plates on which the respective recordings are to be made. In operation of the storage system, a uniform charge is placed on a selected subarea of the photoconductive and thermoplastic layers by connecting a potential source $V_c$ across a respective charging plate 15 and a conductive segment such as segment 12*b* by positioning switches S1 and S2*a*, S2*b*, S2*c*, etc., to appropriate positions. The function of switches S3*a*, S3*b*, S3*c*, etc., which are ganged with switches S2*a*, S2*b*, etc., respectively, will be explained subsequently in conjunction with the heating steps of the invention. A potential source $V_c$ of about 800 volts is suitable for applying the uniform electrostatic charge. The essential requirement for this type of charging is that the charging potential $V_c$ must be sufficient to ionize the ambient air or gas in the vicinity of the plate which the recording is to be made. For the position of the switches illustrated in the figure, a uniform charge is produced at segment 12*b* of the front storage plate. Switch S2*a* can be moved successively to each tap position while switch S1 remains in the indicated position to charge each subarea of the front storage plate on which it is desired to record data. Then, upon directing recording reference and signal light beams through the stack of plates, the charge pattern on the thermoplastic layer in the area of conductive segment 12 *b* will be spatially modulated in accordance with the interference occurring between the beams so as to be uniquely representative of the data carried by the signal beam. In other words, charge migration will occur at points of constructive interference between the beams since the impedance of the photoconductive layer is switched to a low value at those points while at the points of destructive interference the charge will remain relatively unaffected. Details of the recording and reading procedure and structure for implementation thereof will be described in greater detail subsequently with reference to FIG. 2. After forming the interference pattern, the heating source of electric potential $V_H$ is connected across the conductive segment selected for charging by way of switches S2*a* and S3*a* which are connected so that switch S3*a* rotates counter-clockwise in synchronism with clockwise rotation of switch S2*a*. A pulse of electrical energy is supplied at the output of source $V_H$ for application to the wiper contacts of switches S2*a*, S3*a*, S2*b*, S3*b*, etc., by means of a push button switch (not shown) on the heating potential source. This electrical pulse is applied via switches S2*a* and S3*a* across the respective conductive segments (segment 12*b* for the illustrated position of the switches) and produces heat to soften the region of the thermoplastic overlaying the selected conductive segment to develop the modulated charge pattern as a corresponding deformation image. For a segment area of 2 square millimeters having a surface resistance of 65 Ohms per square in combination with the aforementioned thicknesses of the respective layers, a pulse of 23 volts and 3.85 milliseconds duration has satisfactorily produced the required softening. Upon termination of the heat pulse the thermoplastic hardens and the deformation image is fixed in the surface thereof. At this time another heat pulse is applied from source $V_H$ to the conductive segment to soften the thermoplastic such that the surface becomes smooth once again whereupon the deformation image is converted to a latent image in readiness for being reconstituted as a physically detectable deformation image when the data stored at that particular subarea of the storage plate is desired to be read out. A pulse of 26.2 volts and 3.85 miliseconds duration satisfactorily produces the desired conversion to latent image form.

Data recording in latent image form is similarly performed in succession at each subarea of the front photoplastic plate in the aforedescribed manner by moving switches S2*a* and S3*a* to the appropriate position while switch S1 remains at the indicated position. The recording beams, of course, must be directed on to the particular subarea selected for charging and heating. In a similar manner, by positioning switch S1 at the next counterclockwise tap position and using switches S2*b* and S3*b*, with all other S2 and S3 switches in the off position, recordings can be made on the photoplastic medium on the reverse side of the front storage unit and so on for each succeeding storage unit by connecting switch S1 to the appropriate charging plate 15 and using the related switches S2*c*, S3*c*, etc. From the foregoing description it will be appreciated therefore that only one subarea of one plate is charged and heated during successive steps of the procedure while the recording beams are directed through all of the plates. In this way the recording is made only at the subarea of the particular plate where the charge and heat is applied.

After recording has been completed, the data in any subarea of any plate may be selected for readout simply by positioning switch S1 and the appropriate S2 and S2 switches to recharge the selected subarea uniformly from source $V_c$ as in the case of recording and then applying a pulse from source $V_H$ via appropriate S2 and S3 switches to reheat the selected subarea as in the exposure step during recording. This action reconstitutes the latent image as a deformation image. Then upon directing a readout beam oppositely to the reference beam used in recording, an image of the recorded data is reconstructed in accordance with conventional holographic practice.

Complete erasure of the data recorded at any subarea of the stack can be accomplished by applying sufficient heat to soften the photoplastic to the extent that both the charge pattern and any deformation are eliminated. This erasure may be facilitated by applying the charge voltage during the heating time.

Figure 2:
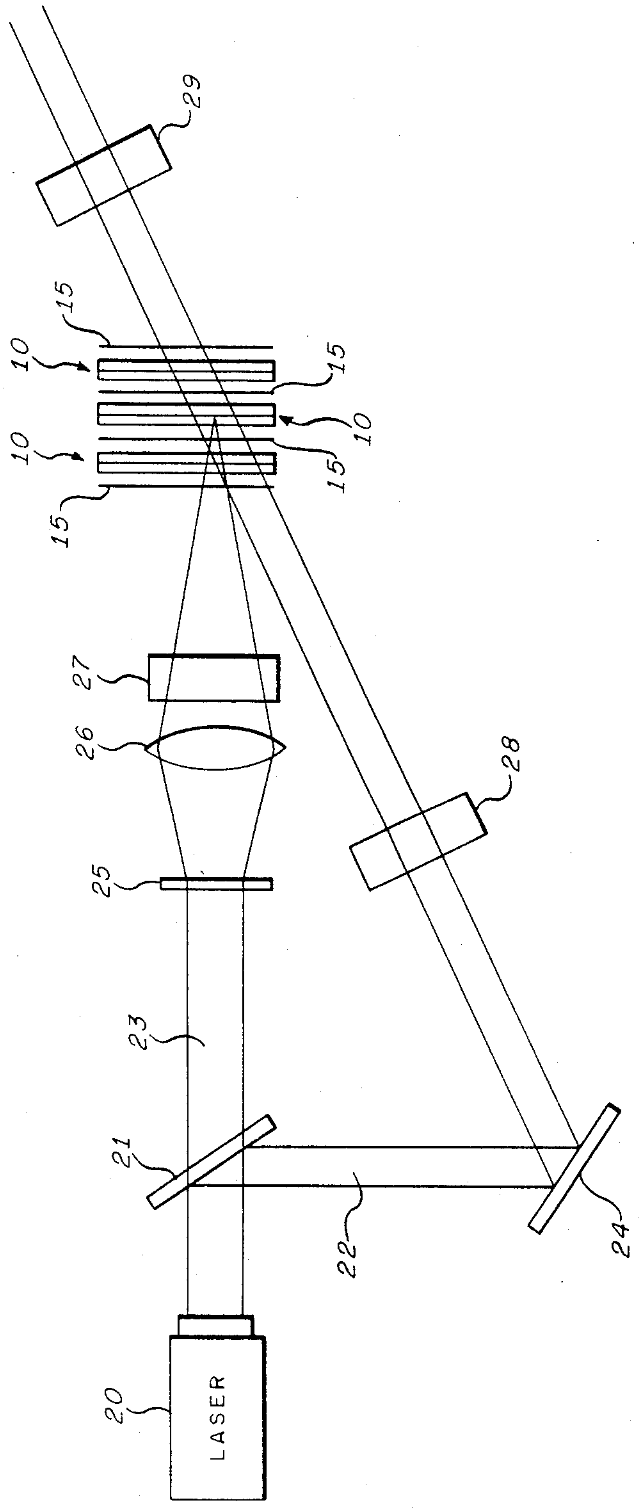
FIG. 2 is a schematic illustration of holographic apparatus for recording and reading information stored in a stack of storage units as shown in FIG. 1.

Further details of the holographic recording and reading process, particularly regarding the steps of exposing and illuminating for reading will now be described with reference to FIG. 2, wherein the details of the layered structure of the storage units 10 has been omitted for ease of illustration. As explained in the preceding paragraphs, after uniformly charging a selected subarea of a particular plate, the photoplastic storage medium is exposed to the recording beams, which are preferably obtained from a laser 20. A beam splitter 21 divides the beam from the laser into two beams 22 and 23 which may be adjusted in relative intensity and path lengths by means well known in the art for optimum holographic performance. Beam 22 is reflected from mirror 24 and directed on to the storage units as a reference beam. Beam 23 propagates through a transparency 25 containing the data to be recorded and is then focused by a zoom lens 26 as a signal beam in superposed relation with the reference beam on to the plate on which the recording is to be made. Zoom lens 26 functions to focus the signal beam onto the particular photoplastic plate subarea in which the transparency data is to be recorded. This action of exposing the plate, coupled with the subsequent steps of developing and converting to latent image form produces a Fourier transform hologram in the subarea in which the recording is made. Readout of the data, subsequent to recharging and reheating as previously explained for the purpose of reconstituting a latent image as a deformation image is accomplished in conventional manner by illuminating the subarea desired to be read out with a read beam propagating in the direction opposite to that of the reference beam used for recording whereby an image of transparency 25 is reconstructed on a viewing screen positioned at the location occupied by the transparency during recording. Light deflectors 27 and 28 serve to direct the reference and signal beams respectively to the discrete subareas during recording and likewise deflector 29 appropriately directs the reference beam during readout.

While the invention has been described in its preferred embodiment, it is to be understood that the words which have been used are words of description rather than limitation and changes may be made within the purview of the appended claims without departing from the true scope and spirit of the invention in its broader aspects.

We claim:

1. A method of recording data in an electro-optical memory including a plurality of tandemly disposed closely spaced photoplastic recording plates, comprising the steps of applying a uniform electrostatic charge to an area of a selected plate on which data is to be recorded, propagating light bearing the data to be recorded through the plurality of plates to expose the recording area of the selected plate and produce thereat a spatially modulated charge pattern representative of the recording data, applying heat to soften the recording area of the selected plate and thereby develop the charge pattern as a corresponding deformation image which becomes hardened on the surface of the selected plate after removal of the developing heat and cooling of the recording area, and applying to the recording area of the selected plate, after the step of developing, greater heat then used in developing to convert the deformation image to a latent image in which condition, after removal of the converting heat and cooling of the recording area, the deformation image is substantially removed from the surface of the plate.

2. The method of claim 1 including additional steps for reading information recorded on any plate, said additional steps comprising applying a uniform electrostatic charge to an area of a selected plate in which data is recorded as a latent image and from which data is to be read, applying heat to soften the recording area from which data is to be read to reconstitute the latent image as a deformation image, and directing a readout light beam onto the reconstituted deformation image to produce a reconstructed image of the recorded data for observation on a viewing screen.

3. The method of claim 1 wherein the step of converting each deformation image to a latent image is performed after developing an individual deformation image and before proceeding to make another recording on any of the plurality of plates by the steps of uniformly charging, exposing, and developing as a deformation image.

4. The method of claim 1 wherein the step of converting a deformation image on any plate to a latent image is performed prior to recording data as a deformation image on another plate further disposed along the plurality of plates in the direction of propagation of the recording light.

5. The method of claim 1 wherein the data is recorded on each photoplastic plate as a hologram by exposing a data recording area simultaneously to light of a first beam functioning as a data bearing beam and to light of a second beam functioning as a reference beam which impinges on the recording area in angularly spaced and superposed relation with the data bearing beam.

6. The method of claim 5 including additional steps for reading information recorded on any plate, said additional steps comprising applying a uniform electrostatic charge to an area of a selected plate in which data is recorded as a latent image and from which data is to be read, applying heat to soften the recording area from which data is to be read to reconstitute the latent image as a deformation image, and directing a readout light beam onto the reconstituted deformation image to produce a reconstructed image of the recorded data for observation on a viewing screen.

7. The method of claim 1 wherein the steps of uniformly charging, exposing, developing, and converting to latent image are performed repetitively on each plate so as to record a plurality of latent images on discrete areas in side by side relation on each of the plurality of recording plates.

8. The method of claim 7 wherein the step of converting a deformation image on any plate to a latent image is performed prior to recording data as a deformation image on another plate further disposed along the plurality of plates in the direction of propagation of the recording light.

9. The method of claim 8 wherein the data is recorded on each photoplastic plate as a hologram by exposing a data recording area simultaneously to light of a first beam functioning as a data bearing beam and to light of a second beam functioning as a reference beam which impinges on the recording area in angularly spaced and superposed relation with the data bearing beam.

10. The method of claim 9 including additional steps for reading information recorded on any plate, said additional steps comprising applying a uniform electrostatic charge to an area of a selected plate in which data is recorded as a latent image and from which data is to be read, applying heat to soften the recording area from which data is to be read to reconstitute the latent image as a deformation image, and directing a readout light beam onto the reconstituted deformation image to produce a reconstructed image of the recorded data for observation on a viewing screen.

11. An electro-optical memory comprising a plurality of tandemly disposed photoplastic recording plates, means cooperatively associated with each plate for applying a uniform electrostatic charge to an area of any selected plate on which data is to be recorded, means for propagating light bearing the data to be recorded through the plurality of plates to expose the recording area of the selected plate and produce thereat a spatially modulated charge pattern representative of the recording data, and means cooperatively associated with each plate for applying heat to soften the recording area of the selected plate and thereby develop the charge pattern as a corresponding deformation image, which becomes hardened on the surface of the plate after removal of the developing heat and cooling of the recording area, and thereafter applying to the recording area greater heat than used in developing to convert the deformation image to a latent image in which condition, after removal of the converting heat and cooling of the recording area, the deformation image is substantially removed from the surface of the plate.

12. The apparatus of claim 11 wherein the electrostatic charging means associated with each plate is selectively operable after converting the deformation image to a latent image for uniformly recharging an area of a selected plate in which data is recorded as a latent image, the heat applying means associated with the selected plate is further operative to soften a recharged area to reconstitute the latent image as a deformation image, and the light propagating means is operative to direct a readout light beam onto the reconstituted deformation image to produce a reconstructed image of the recorded data for observation on a viewing screen.

13. The apparatus of claim 11 wherein the light propagating means comprises means for directing a data bearing light beam and a reference light beam through the plurality of plates so as to be incident in angularly spaced superposed relation on a uniformly charged region of a selected plate to produce a holographic interference pattern representative of the data which is recorded.

14. The apparatus of claim 13 wherein the electrostatic charging means associated with each plate is selectively operable after converting the deformation image to a latent image for uniformly recharging an area of a selected plate in which data is recorded as a latent image, the heat applying means associated with the selected plate is further operative to soften a recharged area to reconstitute the latent image as a deformation image, and the light propagating means is modified to direct a readout beam only through the plurality of plates substantially along the path of the reference beam used in recording the data to reproduce a reconstructed image of the recorded data for observation on a viewing screen.

* * * * *